United States Patent [19]
Miyazaki et al.

[11] Patent Number: 5,786,872
[45] Date of Patent: Jul. 28, 1998

[54] MOTION DETECTION CIRCUIT CALCULATES DIFFERENCE BETWEEN INPUT VIDEO SIGNAL AND ONE FRAME-PERIOD SIGNAL

[75] Inventors: Shinichirou Miyazaki; Masaharu Tokuhara, both of Kanagawa, Japan

[73] Assignee: Sony Corporation, Tokyo, Japan

[21] Appl. No.: 685,974

[22] Filed: Jul. 22, 1996

[30] Foreign Application Priority Data

Jul. 26, 1995 [JP] Japan ................ 7-190014

[51] Int. Cl.$^6$ ........................... H04N 9/78
[52] U.S. Cl. ........................... 348/669; 348/670
[58] Field of Search ........................... 348/663, 664, 348/665, 666, 667, 668, 669, 670, 699; H04N 9/77, 9/78, 5/14, 9/64

[56] References Cited

U.S. PATENT DOCUMENTS

| | | | |
|---|---|---|---|
| 4,930,012 | 5/1990 | Fujita | 348/666 |
| 5,023,713 | 6/1991 | Nishigori | 348/666 |
| 5,063,438 | 11/1991 | Faroudja | 348/667 |
| 5,325,186 | 6/1994 | Ishizuki et al. | 348/663 |
| 5,412,434 | 5/1995 | Taniguchi et al. | 348/669 |
| 5,475,445 | 12/1995 | Yamaguchi et al. | 348/663 |
| 5,500,686 | 3/1996 | Yamaguchi et al. | 348/663 |

*Primary Examiner*—Mark R. Powell
*Assistant Examiner*—John W. Miller
*Attorney, Agent, or Firm*—Jay H. Maioli

[57] ABSTRACT

An apparatus and method in which a difference between lines in an input composite video signal is calculated. The difference is compared with a specified threshold to detect chrominance correlation. A difference between lines in a composite video signal which is delayed for a one-frame period is calculated. The difference is compared with the specified threshold to detect chrominance correlation. The difference between these chrominance correlations is calculated and is used as a motion detection signal. When this frame difference is smaller than a specified threshold, the motion detection signal is forcibly set to 0.

9 Claims, 11 Drawing Sheets

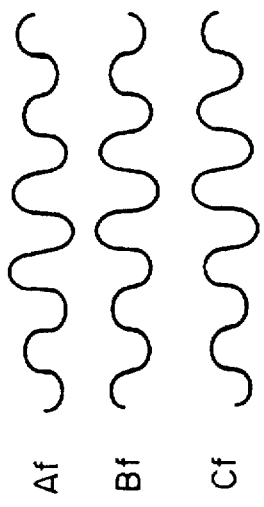
FIG. 4A
3.58MHz CHROMINANCE COMPONENT + 2.68MHz Y COMPONENT
TWO CLOCKS
FOUR CLOCKS
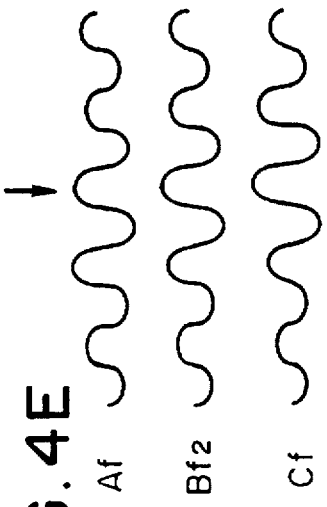
FIG. 4D
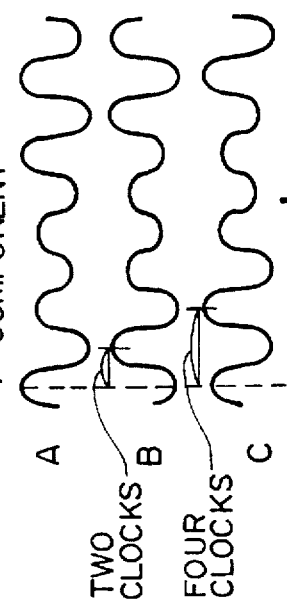
FIG. 4B
FIG. 4C
B2≠A or B2≠C
HORIZONTAL CORRELATION OUTPUT BECOMES ZERO
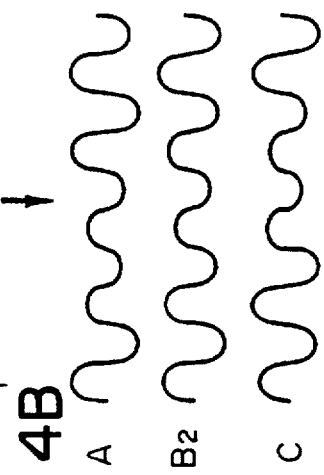
FIG. 4E
FIG. 4F
Bf2≠Af or Bf2≠Cf
HORIZONTAL CORRELATION OUTPUT BECOMES ZERO
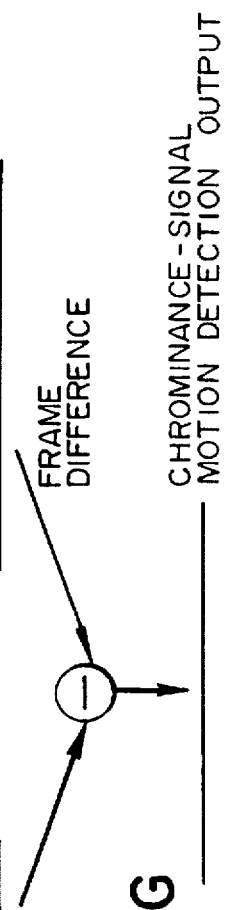
FRAME DIFFERENCE
CHROMINANCE-SIGNAL MOTION DETECTION OUTPUT
FIG. 4G

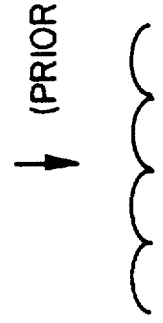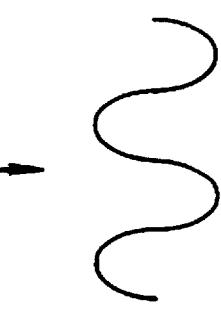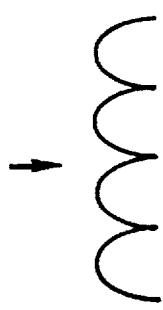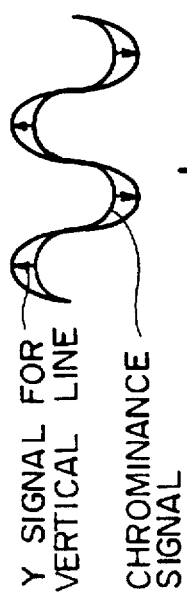
SIGNALS BEFORE FRAME BUFFER
SIGNALS AFTER FRAME BUFFER
FIG. 11A (PRIOR ART)
Y SIGNAL FOR VERTICAL LINE
CHROMINANCE SIGNAL
FIG. 11B (PRIOR ART)
FIG. 11C (PRIOR ART)
FIG. 11D (PRIOR ART)
FIG. 11E (PRIOR ART)
BPF OUTPUT
FIG. 11F (PRIOR ART)
ABSOLUTE-VALUE CALCULATION OUTPUT
CHROMINANCE-SIGNAL MOTION-DETECTION OUTPUT
FIG. 11G (PRIOR ART)

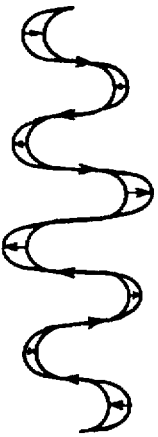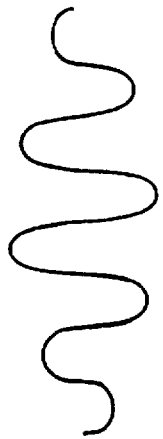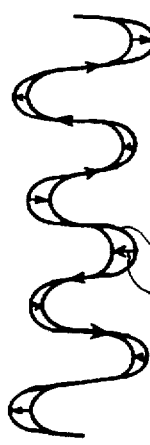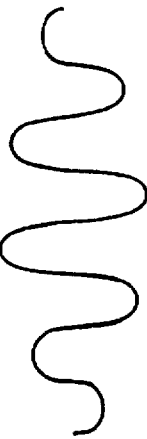
FIG.12A SIGNALS BEFORE FRAME BUFFER
3.58 MHz CHROMINANCE COMPONENT + 2.68 MHz Y COMPONENT
FIG.12B BPF OUTPUT
FIG.12C ABSOLUTE-VALUE CALCULATION OUTPUT
FIG.12D SIGNALS AFTER FRAME BUFFER (CHROMINANCE PHASE IS INVERTED AND Y PHASE IS SAME)
FIG.12E
FIG.12F
FIG.12G CHROMINANCE-SIGNAL MOTION-DETECTION OUTPUT

MOTION DETECTION CIRCUIT CALCULATES DIFFERENCE BETWEEN INPUT VIDEO SIGNAL AND ONE FRAME-PERIOD SIGNAL

BACKGROUND OF THE INVENTION

1. Field of the Invention

The present invention relates to a motion detection circuit, motion detection method, and a luminance-/chrominance-signal separation apparatus. It relates to, for example, a motion detection circuit, motion detection method, and a luminance-/chrominance-signal separation apparatus which are suited to a television receiver, video cassette tape recorder, and laser disk equipment.

2. Description of the Related Art

Thanks to progress in semiconductor technologies, frame memory has come to be available to commercial products. In a Y/C separation for a composite video signal, a frame comb filter has been employed. FIG. 7 is a block diagram showing a configuration of such a frame comb filter. FIG. 8 illustrates the phase relationship between scanning lines and a color subcarrier. As shown in the phase relationship illustrated in FIG. 8, since the phase of the subcarrier shifts an angle of π between the current line and the line one frame before, in a still picture, ideal Y/C separation can be obtained with the use of frame correlation. In other words, interference in a television receiver, such as cross color and dots, can be completely removed, and a stable, high-quality screen can be enjoyed.

In FIG. 7, a frame buffer 1 stores an input composite video signal and outputs it after a one-frame period. An adder 2 and an adder 5 calculate the differences between input signals and output the differences. A band pass filter (BPF) 3 separates the chrominance signal from the input signal and outputs the chrominance signal.

A composite video signal input to this frame comb filter is input to the frame buffer 1 and stored. When a one-frame period elapses, the composite video signal stored in the frame buffer 1 is output and supplied to the adder 2. The current, input composite video signal is also input to the adder 2. The adder 2 calculates the difference between the current, input composite video signal and the composite video signal supplied from the frame buffer 1, which is delayed by a one-frame period. As described above, since the phase of the color subcarrier shifts by an angle of π between the composite video signal delayed for a one-frame period and the current, input composite signal, a chrominance signal is extracted.

The BPF 3 separates a chrominance signal further from the input signal, outputs and supplies it to the adder 5 as a C signal. The current, input composite video signal is delayed in a Delay line (DL) circuit 4 and supplied to the adder 5. The difference between this signal and the signal sent from the BPF 3 is calculated and the result is output as a luminance (Y) signal.

In a motion picture, since a constant phase relationship of chrominance signals is not maintained between frames, a conventional intrafield Y/C separation must be used. Therefore, a motion detection circuit is required. FIG. 9 is a block diagram showing a configuration of a Y/C separation circuit using such a motion detection circuit. Since the chrominance signal has the same phase in every other frame, a motion component in the chrominance signal is detected by a two-frame difference. This method does not malfunction at all in chrominance-signal motion detection even in any still picture.

In FIG. 9, each of line memory 11, 12, and 14 delays a signal for one horizontal scanning period (1 H). Each of memory 13 and 15 delays a signal for 524 horizontal scanning periods (524 H). The line memory 12 and the memory 13 form a frame buffer, and in the same way, the line memory 14 and memory 15 form a frame buffer. An intrafield comb filter 22 separates a chrominance signal from input signals for adjacent three lines, and outputs the chrominance signal. A Y-signal motion detection circuit 16 performs motion detection according to the luminance signal from signals for a plurality of lines which are shifted from each other by one horizontal scanning period. A C-signal motion detection circuit 17 conducts motion detection according to the chrominance signal from signals for a plurality of lines which are shifted from each other by one frame period.

An adder 18 calculates the difference between input composite video signals. A Max output section 19 generates the specified control signal from the input signal from the Y-signal motion detection circuit 16 and the input signal from the C-signal motion detection circuit 17, and supplies the control signal to a mix selector 20. According to this control signal sent from the Max output section 19, the mix selector 20 selectively outputs the input signal sent from the intrafield comb filter 22 or the input signal sent from the adder 18, as a C (chrominance) signal. An adder 21 calculates the difference between the input signal sent from the mix selector 20 and the input signal sent from the C-signal motion detection circuit 17, and outputs the difference as the Y signal.

A composite video signal input to a Y/C separation circuit having the configuration described above is supplied to the line memory 11 as well as to the intrafield comb filter 22. The composite video signal is temporarily stored in the line memory 11 and output after one horizontal scanning period. The signal output from the line memory 11 is supplied to the intrafield comb filter 22, the adder 18, the Y-signal motion detection circuit 16, the C-signal motion detection circuit 17, the adder 21, and the line memory 12. The signal output from the line memory 12 is supplied to the intrafield comb filter 22, the Y-signal motion detection circuit 16, and the memory 13.

The memory 13 can store an image signal of 524 lines and supplies its output signal to the line memory 14 as well as to the Y-signal motion detection circuit 16 and the adder 18. The output signal of the line memory 14 is supplied to the Y-signal motion detection circuit 16 and the memory 15. The memory 15 outputs a signal to the C-signal motion detection circuit 17.

The intrafield comb filter 22 separates a chrominance signal and outputs it by calculating the difference between the current, input composite video signal and the composite video signal for the line one line before, which is output from the line memory 11. The Y-signal motion detection circuit 16 performs motion detection according to the luminance signal, using the signal output from the line memory 11, the signal output from the line memory 12, and so on, and supplies the signal corresponding to the detection result to the Max output section 19.

The C-signal motion detection circuit 17 performs motion detection according to the chrominance signal, using the signal output from the line memory 11 and the signal output from the memory 15, which is delayed for a one-frame period, and supplies the signal corresponding to the detection result to the Max output section 19. The Max output section 19 outputs to the mix selector 20 whichever is larger of the signal corresponding to the detection result in the Y-signal motion detection signal 16 and the signal corresponding to the detection result in the C-signal motion detection signal 17.

When the mix selector 20 receives a signal corresponding to the detection result which indicates that motion has been detected from the Y-signal motion detection circuit 16 or the C-signal motion detection circuit 17, the mix selector 20 selectively outputs the chrominance signal supplied from the intrafield comb filter 22. By contrast, when the mix selector 20 receives a signal corresponding to the detection result which indicates that motion has not been detected from the Y-signal motion detection circuit 16 or the C-signal motion detection circuit 17, the mix selector 20 selectively outputs the chrominance signal supplied from the adder 18.

The output signal from the mix selector 20 is regarded as the chrominance signal and is supplied to the adder 21. The adder. 21 calculates the difference between this chrominance signal and the composite video signal from the line memory 11 and outputs the difference as the Y signal.

Since this method requires two-frame memory, however, the cost increases. Chrominance-signal motion detection has been performed with one-frame memory these days. FIG. 10 is a block diagram showing a configuration of such a chrominance-signal motion detection circuit using one-frame memory. BPFs 32 and 34 separate the chrominance signal from the input composite video signal. Absolute-value calculation sections (ABSs) 33, 35, and 37 calculate the absolute value of the input signal and outputs the result. A multiplier 38 multiplies the input signal by the specified coefficient, performs gain adjustment, and outputs the result. A limiter 39 removes the level fluctuation of the signal output from the multiplier 38, and outputs the result.

A composite video signal input to such a chrominance motion detection circuit is supplied to a frame buffer 31 and the BPF 32. The BPF 32 separates the chrominance signal from the input composite signal. The ABS 33 calculates the absolute value of the separated chrominance signal and supplies the result to an adder 36. On the other hand, the composite video signal supplied to the frame buffer 31 is output to the BPF 34 with a delay of a one-frame period. The BPF 34 separates the chrominance signal from the composite video signal output from the frame buffer 31, which is delayed for a one-frame period. The ABS 35 calculates the absolute value of the separated chrominance signal, and supplies the result to the adder 36.

The adder 36 calculates the difference between the signal from the ABS 33 and the signal from the ABS 35, and supplies the result to the ABS 37. The ABS 37 calculates the absolute value of the signal from the adder 36 and supplies the result to the multiplier 38. The multiplier 38 multiplies the signal from the ABS 37 by the specified coefficient, performs gain adjustment, and outputs to the limiter 39. The limiter 39 removes the level fluctuation of the signal output from the multiplier 38, and outputs the result.

The chrominance signal is separated from the input composite signal using the band pass filter (BPF) and the frame difference of the absolute values of the chrominance signals is calculated. With this method, motion detection is performed according to the chrominance signal with the use of a one-frame buffer.

However, the conventional chrominance motion detection circuit shown in FIG. 10 may malfunction in a still picture including thin, color, vertical lines or diagonal lines having frequencies near the subcarrier frequency.

FIG. 11 shows the signals before and after the frame buffer 31, which correspond to color, vertical lines having frequencies near the subcarrier frequency. The signals are frequency-separated from the composite video signal by BPFs. FIGS. 11A, 11B, and 11C show the signals before the frame buffer 31, and FIGS. 11D, 11E, and 11F show the signals after the frame buffer 31.

As shown in FIGS. 11A and 11D, the Y signal indicated by arrows have the same phase at any frame, but the chrominance signal has the phase inverted at every frame. Therefore, the chrominance signal becomes different in every frame as shown in FIGS. 11B and 11E when the signal is just separated by the BPF. When the absolute values thereof are calculated as shown in FIGS. 11C and 11F and the difference between the absolute values are calculated, the chrominance-signal motion detection output signal is not zero as shown in FIG. 11G. This means that a motion component has been detected even in this still picture, and the conventional intrafield comb filter is erroneously selected in this frame to cause cross color and dot interference.

FIG. 12 shows the signals before and after the frame buffer 31, which correspond to color, diagonal lines having frequencies near the subcarrier frequency. The signals are frequency-separated from the composite video signal by BPFs. FIGS. 12A, 12B, and 12C show the signals before the frame buffer 31, and FIGS. 12D, 12E, and 12F show the signals after the frame buffer 31.

As shown in FIGS. 12A and 12D, the Y signal indicated by arrows have the same phase at any frame, but the chrominance signal has the phase inverted at every frame. Therefore, the chrominance signal becomes different in every frame as shown in FIGS. 12B and 12E when the signal is just separated by the BPF. When the absolute values thereof are calculated as shown in FIGS. 12C and 12F and the difference between the absolute values are calculated, the chrominance-signal motion detection output signal is not zero as shown in FIG. 12G. This means that a motion component has been detected even in this still picture, and the conventional intrafield comb filter is erroneously selected in this frame to cause cross color and dot interference.

SUMMARY OF THE INVENTION

The present invention has been made to solve the above problems.

Accordingly, it is an object of the present invention to enable correct motion detection to be performed even in a still picture including thin, vertical lines and diagonal lines, and to allow occurrence of cross color and dot interference to be suppressed in a still picture.

The foregoing objects are achieved according to one aspect of this invention through the provision of a motion detection circuit comprising: delaying means for outputting the input signal corresponding to the specified image with a delay of a one-frame period; first detection means for detecting chrominance correlation from the signal; second detection means for detecting chrominance correlation from the delayed signal output from the delaying means; first calculation means for calculating the difference between the detection result output from the first detection means and the detection result output from the second detection means; second calculation means for calculating the difference between the signal and the delayed signal; comparison means for comparing the calculation result output from the second calculation means with the specified reference level; and output means for outputting a motion detection result according to the comparison result output from the comparison means and the calculation result output from the first calculation means.

The motion detection circuit may be configured such that, according to the signal corresponding to the specified line in the image corresponding to the signal and the signals corresponding to the lines immediately before and after the line, the first detection means detects chrominance correlations between the lines, and, according to the signal corresponding to the specified line in the image corresponding to the delayed signal and the signals corresponding to the lines immediately before and after the line, the second detection means detects chrominance correlations between the lines.

The motion detection circuit may be configured such that the first detection means detects chrominance correlation between the signals having phases shifted from each other by two burst clocks whose frequency is four times the subcarrier frequency, and the second detection means detects chrominance correlation between the delayed signals having phases shifted from each other by the two burst clocks.

In the motion detection circuit, chrominance correlation of the signal corresponding to the specified image is detected by the first detection means, chrominance correlation of the signal which is delayed for a one-frame period by the delaying means is detected by the second detection means, and according to the difference therebetween and the frame difference calculated by the second calculation means, a motion detection result is output by the output means. Therefore, it can be determined whether the image corresponding to the input signal is a still picture according to the presence of chrominance correlation in the field.

The foregoing objects are achieved according to another aspect of this invention through the provision of a motion detection method comprising the steps of: outputting the input signal corresponding to the specified image with a delay of a one-frame period; detecting chrominance correlation from the signal; detecting chrominance correlation from the delayed signal output with a delay of a one-frame period; calculating the difference between the detection result of the signal output and the detection result of the delayed signal output; calculating the difference between the signal and the delayed signal; comparing the calculation result with the specified reference level; and outputting a motion detection result according to the comparison result and the difference between the detection result of the chrominance correlation of the signal and the detection result of the chrominance correlation of the delayed signal.

The motion detection method may be configured such that, according to the signal corresponding to the specified line in the image corresponding to the signal and the signals corresponding to the lines immediately before and after the line, chrominance correlations between the lines are detected, and according to the signal corresponding to the specified line of the image corresponding to the delayed signal and the signals corresponding to the lines immediately before and after the line, chrominance correlations between the lines are detected.

The motion detection method may be configured such that the chrominance correlation between the signals having phases shifted from each other by two burst clocks whose frequency is four times the subcarrier frequency is detected, and the chrominance correlation between the delayed signals having phases shifted from each other by the two burst clocks is detected.

In the motion detection method, a motion detection result is output according to the difference between chrominance correlation of the signal corresponding to the specified image and chrominance correlation of the signal which is delayed for a one-frame period, and the frame difference. Therefore, according to the chrominance correlation in a field, it can be determined whether the image corresponding to the input signal is a still picture.

The above-described operations are conducted in the motion detection circuit and in the motion detection method. Therefore, while the memory capacity required for motion detection can be reduced to one frame, an error can be suppressed when the process for determining whether an image including a chrominance signal and high-frequency components of a luminance signal is a still picture or a motion picture is performed. Occurrence of cross color and dot interference can also be suppressed.

The foregoing objects are achieved according to still another aspect of this invention through the provision of a luminance-/chrominance-signal separation apparatus comprising: delaying means for outputting the input signal corresponding to the specified image with a delay of a one-frame period; first detection means for detecting chrominance correlation from the signal; second detection means for detecting chrominance correlation from the delayed signal output from the delaying means; first calculation means for calculating the difference between the detection result output from the first detection means and the detection result output from the second detection means; second calculation means for calculating the difference between the signal and the delayed signal; comparison means for comparing the calculation result output from the second calculation means with the specified reference level; output means for outputting a motion detection result according to the comparison result output from the comparison means and the calculation result output from the first calculation means; motion detection means for detecting motion according to the luminance signal; first separation means for separating the chrominance signal with the use of a signal in the field; second separation means for separating the chrominance signal with the use of frame correlation; selection means for selectively outputting either the signal output from the first separation means or the signal output from the second separation means according to the signal output from the motion detection means and the signal output from the output means; and third separation means for separating the luminance signal according to the signal output from the selection means.

The luminance-/chrominance-signal separation apparatus may be configured such that, according to the signal corresponding to the specified line in the image corresponding to the signal and the signals corresponding to the lines immediately before and after the line, the first detection means detects chrominance correlations between the lines, and, according to the signal corresponding to the specified line in the image corresponding to the delayed signals and the signals corresponding to the lines immediately before and after the line, the second detection means detects chrominance correlations between the lines.

The luminance-/chrominance-signal separation apparatus may be configured such that the first detection means detects chrominance correlation between the signals having phases shifted from each other by two burst clocks whose frequency is four times the subcarrier frequency, and the second detection means detects chrominance correlation between the delayed signals having phases shifted from each other by the two burst clocks.

In the luminance-/chrominance-signal separation apparatus, chrominance correlation of the signal corresponding to the specified image is detected by the first detection means, chrominance correlation of the signal which is delayed for a one-frame period by the delaying means is detected by the second detection means, and according to the chrominance-correlation difference therebetween and the frame difference calculated by the second calculation means, a motion detection result is output by the output means. According to this motion detection result, either the chrominance signal separated by the first separation means or the chrominance signal separated by the second separation means is selected by the selection means. Therefore, according to whether the input signal indicates a still picture, the luminance-signal and chrominance-signal separation method can be changed. Therefore, even in an image including a chrominance signal and high-frequency components of a luminance signal, occurrence of cross color and dot interference can be suppressed.

BRIEF DESCRIPTION OF THE DRAWINGS

FIGS. 4A–4G are views showing the waveforms of input and output signals of the motion detection circuit, which are obtained when color, diagonal lines having frequencies near the subcarrier frequency are input.

FIGS. 11A–11G are views showing the waveforms of input and output signals of the conventional chrominance-signal motion detection circuit, which are obtained when color, vertical lines having frequencies near the subcarrier frequency are input.

FIGS. 12A–12G are views showing the waveforms of input and output signals of the conventional chrominance-signal motion detection circuit, which are obtained when color, diagonal lines having frequencies near the subcarrier frequency are input.

DETAILED DESCRIPTION OF THE PREFERRED EMBODIMENTS

Figure 1:
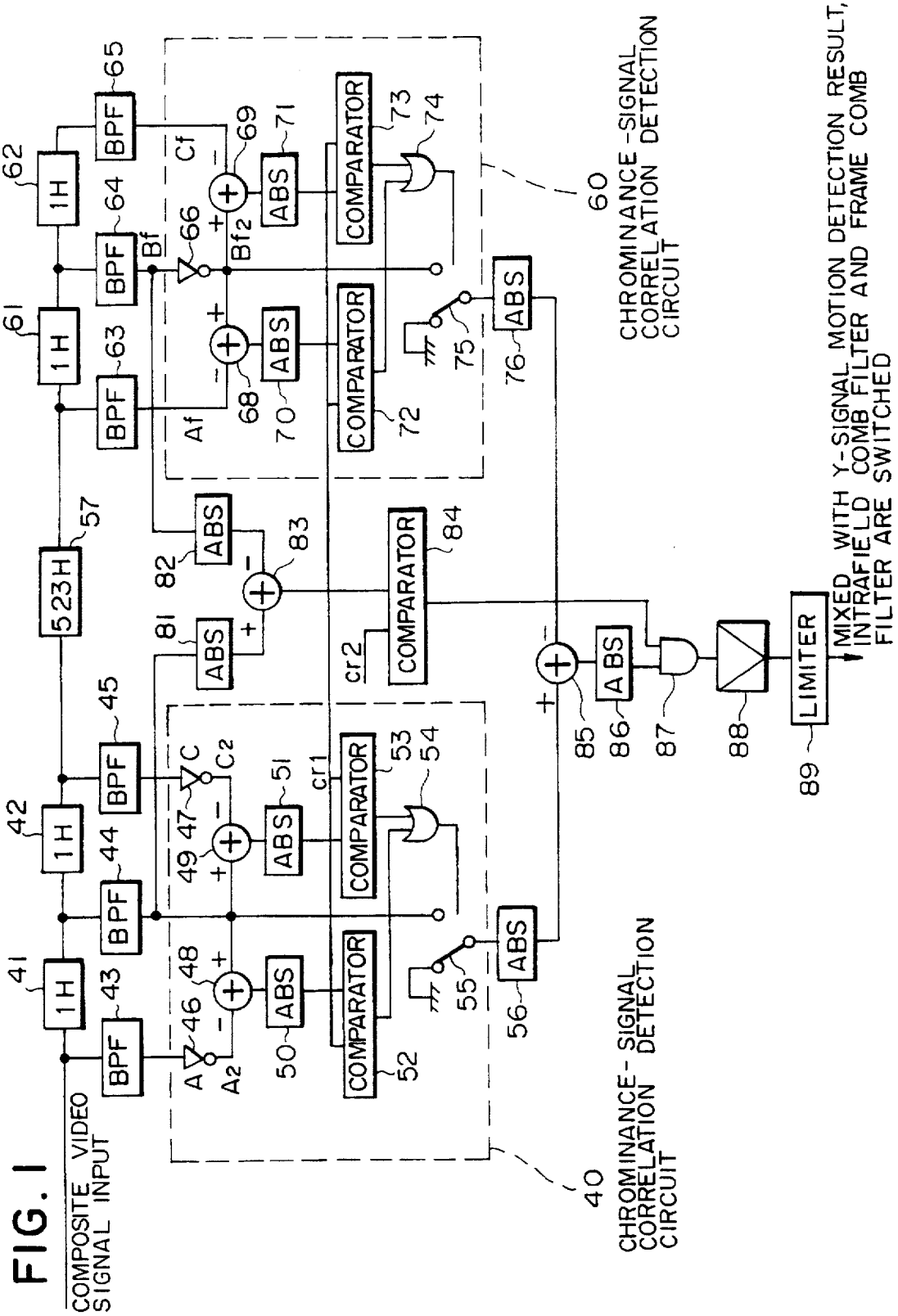
FIG. 1 is a block diagram showing a configuration of a motion detection circuit according to an embodiment of the present invention.

FIG. 1 is a block diagram showing a configuration of a chrominance-signal motion detection circuit according to an embodiment of the present invention. Each of line memory 41, 42, 61, and 62 delays a signal for 1 H (horizontal scanning period) and outputs the result. A frame buffer 57 stores a signal of 523 lines and outputs it after a 523 H period (period corresponding to 523 times the horizontal scanning period).

Each of band pass filters (BPFs) 43, 44, and 45 separates the chrominance signal from the input signal and outputs the chrominance signal. The BPF 44 is connected to a switch 55 described later to allow the output signal of the BPF 44 to be output through the switch 55.

An inversion circuit 46 inverts the polarity of the input signal from the BPF 43 and outputs the result. An inversion circuit 47 inverts the polarity of the input signal from the BPF 45 and outputs the result. An adder 48 calculates the difference between the signal sent from the inversion circuit 46 and the signal sent from the BPF 44 and outputs the difference. An adder 49 calculates the difference between the signal sent from the inversion circuit 47 and the signal sent from the BPF 44, and outputs the difference. An ABS (absolute-value calculator) 50 calculates the absolute value of the input signal from the adder 48, and outputs the value. An ABS 51 calculates the absolute value of the input signal from the adder 49, and outputs the result.

A comparator 52 compares the input signal from the ABS 50 with the specified threshold cr1, and outputs the specified signal corresponding to the comparison result. A comparator 53 compares the input signal from the ABS 51 with the specified threshold cr1, and outputs the specified signal corresponding to the comparison result. An OR circuit 54 calculates the logical OR of the signal sent from the comparator 52 and the signal sent from the comparator 53, and outputs the result. A switch 55 outputs the signal sent from the BPF 44 or a signal having level 0 by switching the internal connection according to the signal sent from the OR circuit 54.

The inversion circuits 46 and 47, the adders 48 and 49, the ABSs 50 and 51, the comparators 52 and 53, the OR circuit 54, and the switch 55 form a chrominance-correlation detection circuit 40 (first detection means).

An ABS 56 calculates the absolute value of the signal sent from the switch 55 and outputs the value.

Each of BPFs 63, 64, and 65 separates the chrominance signal from the input signal and outputs the chrominance signal. The BPF 64 is connected to a switch 75 described later through an inversion circuit 66 described later to allow the inverted output signal of the BPF 64 to be output through the switch 75.

An inversion circuit 66 inverts the polarity of the signal supplied from the BPF 64 and outputs the result. An adder 68 calculates the difference between the signal sent from the BPF 63 and the signal sent from the inversion circuit 66 and outputs the difference. An adder 69 calculates the difference between the signal sent from the inversion circuit 66 and the signal sent from the BPF 65, and outputs the difference. An ABS 70 calculates the absolute value of the signal supplied from the adder 68, and outputs the value. An ABS 71 calculates the absolute value of the signal supplied from the adder 69, and outputs the result.

A comparator 72 compares the signal supplied from the ABS 70 with the specified threshold cr1, and outputs the specified signal corresponding to the comparison result. A comparator 73 compares the signal supplied from the ABS 71 with the specified threshold cr1, and outputs the specified signal corresponding to the comparison result. An OR circuit 74 calculates the logical OR of the signal sent from the comparator 72 and the signal sent from the comparator 73, and outputs the result. A switch 75 outputs the signal sent from the inversion circuit 66 or a signal having level 0 by switching the internal connection according to the signal sent from the OR circuit 74.

The inversion circuit 66, the adders 68 and 69, the ABSs 70 and 71, the comparators 72 and 73, the OR circuit 74, and the switch 75 form a chrominance-correlation detection circuit 60 (second detection means).

An ABS 76 calculates the absolute value of the signal sent from the switch 75 and outputs the value.

An ABS 81 calculates the absolute value of the signal supplied from the BPF 44, and outputs the value. An ABS 82 calculates the absolute value of the signal supplied from the BPF 64, and outputs the result. An adder 83 (second calculation means) calculates the difference between the signal supplied from the ABS 81 and the signal supplied from the ABS 82, and outputs the difference. A comparator 84 (comparison means) compares the signal supplied from the adder 83 with the specified threshold cr2, and outputs the specified signal corresponding to the comparison result.

An adder 85 (first calculation means) calculates the difference between the signal supplied from the ABS 56 and the signal supplied from the ABS 76, and outputs the difference. An ABS 86 calculates the absolute value of the signal supplied from the adder 85, and outputs the result. An AND circuit 87 (output means) calculates the logical AND of the signal supplied from the ABS 86 and the signal supplied from the comparator 84, and outputs the result. A multiplier 88 adjusts the gain of the input signal from the AND circuit 87, and outputs the signal. A limiter 89 reduces the number of bits in the input signal from the multiplier 88 to the specified number of bits.

A composite video signal input to such a motion detection circuit is supplied to the BPF 43 and the line memory 41. The composite video signal supplied to the line memory 41 is output to the line memory 42 and the BPF 44 with a 1 H delay. The composite video signal supplied to the line memory 42 is supplied to the frame buffer 57 and the BPF 45 with a 1 H delay.

Signals corresponding to adjacent three lines 1 H apart in the same field are supplied to the BPFs 43, 44, and 45. The signal supplied to the BPF 43 is inverted in phase by the inversion circuit 46, and output to the adder 48. The signal supplied to the BPF 44 is input to the ABS 56 in response to the connection switching operation of the switch 55. The signal supplied to the BPF 45 is inverted in phase by the inversion circuit 47, and output to the adder 49.

The adder 48 calculates the difference between the composite video signals for the first line and for the next (intermediate) line, and supplies the difference to the ABS 50. The adder 49 calculates the difference between the composite video signals for the intermediate line and the last line, and supplies the difference to the ABS 51. The ABS 50 calculates the absolute value of the supplied signal and supplies the value to the comparator 52. The comparator 52 compares the level of the signal sent from the ABS 50 with the specified threshold cr1. When the level of the signal sent from the ABS 50 is smaller than the threshold cr1, value 1 is output, for example. When the level of the output signal of the ABS 50 is larger than the threshold cr1, value 0 is output.

In the same way, the ABS 51 calculates the absolute value of the supplied signal and supplies the value to the comparator 53. The comparator 53 compares the level of the signal sent from the ABS 51 with the specified threshold cr1. When the level of the signal sent from the ABS 51 is smaller than the threshold cr1, value 1 is output, for example. When the level of the output signal of the ABS 51 is larger than the threshold cr1, value 0 is output.

The signal output from the comparator 52 and the signal output from the comparator 53 are supplied to the OR circuit 54, and the logical OR thereof is calculated and output to the switch 55. The switch 55 changes its internal connection according to the signal supplied from the OR circuit 54. For example, when either the signal output from the comparator 52 or the signal output from the comparator 53 is 1 or more, the output signal of the OR circuit 54 is set to 1, and the switch 55 changes the internal connection such that the signal sent from the BPF 44 is output to the ABS 56.

On the other hand, the composite video signal output from the frame buffer 57 is supplied to the BPF 63 and the line memory 61. The composite video signal supplied to the line memory 61 is output to the line memory 62 and the BPF 64 with a 1 H delay. The composite video signal supplied to the line memory 62 is supplied to the BPF 65 with a 1 H delay.

Signals corresponding to adjacent three lines 1 H apart in the same field are supplied to the BPFs 63, 64, and 65. The signal supplied to the BPF 63 is supplied to the adder 68 as is. The signal supplied to the BPF 64 is inverted in phase by the inversion circuit 66 and is input to the ABS 76 in response to the connection switching operation of the switch 75. The signal supplied to the BPF 65 is supplied to the adder 69 as is.

The adder 68 calculates the difference between the composite video signals for the first line and for the next (intermediate) line, and supplies the difference to the ABS 70. The adder 69 calculates the difference between the composite video signals for the intermediate line and the last line, and supplies the difference to the ABS 71. The ABS 70 calculates the absolute value of the supplied signal and supplies the value to the comparator 72. The comparator 72 compares the level of the signal sent from the ABS 70 with the specified threshold cr1. When the level of the signal sent from the ABS 70 is smaller than the threshold cr1, value 1 is output, for example. When the level of the output signal of the ABS 70 is larger than the threshold cr1, value 0 is output.

In the same way, the ABS 71 calculates the absolute value of the supplied signal and supplies the value to the comparator 73. The comparator 73 compares the level of the signal sent from the ABS 71 with the specified threshold cr1. When the level of the signal sent from the ABS 71 is smaller than the threshold cr1, value 1 is output, for example. When the level of the output signal of the ABS 71 is larger than the threshold cr1, value 0 is output.

The signal output from the comparator 72 and the signal output from the comparator 73 are supplied to the OR circuit 74, and the logical OR thereof is calculated and output to the switch 75. The switch 75 changes its internal connection according to the signal supplied from the OR circuit 74. For example, when either the signal output from the comparator 72 or the signal output from the comparator 73 is 1 or more, the output signal of the OR circuit 74 is set to 1, and the switch 75 changes the internal connection such that the signal sent from the inversion circuit 66 is output to the ABS 76.

The ABS 81 calculates the absolute value of the signal output from the BPF 44, and supplies it to the adder 83. The ABS 82 calculates the absolute value of the signal output from the BPF 64, and supplies it to the adder 83. The adder 83 calculates the difference between the signal supplied from the ABS 81 and the signal supplied from the ABS 82, and outputs it to the comparator 84. The comparator 84 compares the signal supplied from the adder 83 with the specified threshold cr2. When the level of the signal sent from the adder 83 is smaller than or equal to the threshold cr2, a signal having level 0 is output to the AND circuit 87.

The adder 85 calculates the difference between the signals supplied from the ABS 56 and the ABS 76. The ABS 86 calculates the absolute value of the difference and supplies it to the AND circuit 87. The AND circuit 87 calculates the logical AND of the signal supplied from the ABS 86 and the signal supplied from the comparator 84, and outputs to the multiplier 88. Gain adjustment is applied to the signal supplied to the multiplier 88, which is then supplied to the limiter 89. The limiter 89 reduces the number of bits in the supplied signal to the specified number of bits.

Correlations (differences) between the intermediate-line output (output of the line memory 41) and the polarity-inverted outputs of the lines thereafter and therebefore are detected. When either correlation is smaller than or equal to the specified threshold cr1, it is determined that the signal is a chrominance signal, and the intermediate-line signal is output. When both correlations are larger than the specified threshold cr1, it is determined that the signal is not a chrominance signal, and the output value is set to 0. At the delay side of the frame buffer 57, the intermediate-line output (output of the line memory 61) is inverted in phase, and correlations between the signal and the outputs of the lines thereafter and therebefore are detected.

The absolute values of the outputs of the chrominance correlations are calculated, the difference in the frames is calculated, and then the absolute value thereof is calculated and used as the chrominance-signal motion component.

The absolute values of the intermediate-line, chrominance outputs (output from the BPF 44 and that from the BPF 64) after and before the frame buffer 57 are calculated, and the frame difference therebetween is calculated. When the difference is smaller than or equal to the specified threshold cr2, the motion detection output is forcibly set to 0.

When chrominance correlation is detected in lines, since there always exists random noise even in a still picture, the output of either the chrominance-signal correlation detection circuit 40 or the chrominance-signal correlation circuit 60 may become 0 because the correlation in one frame exceeds the threshold. In this case, the frame difference between the chrominance-signal correlation detection circuit 40 and the chrominance-signal correlation detection circuit 60 becomes large, and the intrafield comb filter is selected, causing cross color to occur. To prevent this side effect, when the frame difference between the specified lines which are one frame period apart is small, the motion detection output is forcibly set to 0.

As described above, using the characteristics in which the chrominance signal of a component which is frequency-separated by a BPF has a phase inverted in every line and has the same amplitude, correlations between the signal corresponding to the specified line and the signals for the lines thereafter and therebefore are detected. When it is determined that there exists a correlation between the specified line and one of the lines thereafter and therebefore, the signal is regarded as a chrominance signal, and when otherwise, the signal is set to 0. A circuit for this function is added. The absolute values of the detected correlations are calculated, and the frame difference therebetween is calculated to form a motion detection component. When the frame difference for the component separated by the BPF is smaller than or equal to the specified threshold, the motion detection component is forcibly set to 0. A circuit for this function is also provided.

Figure 2:
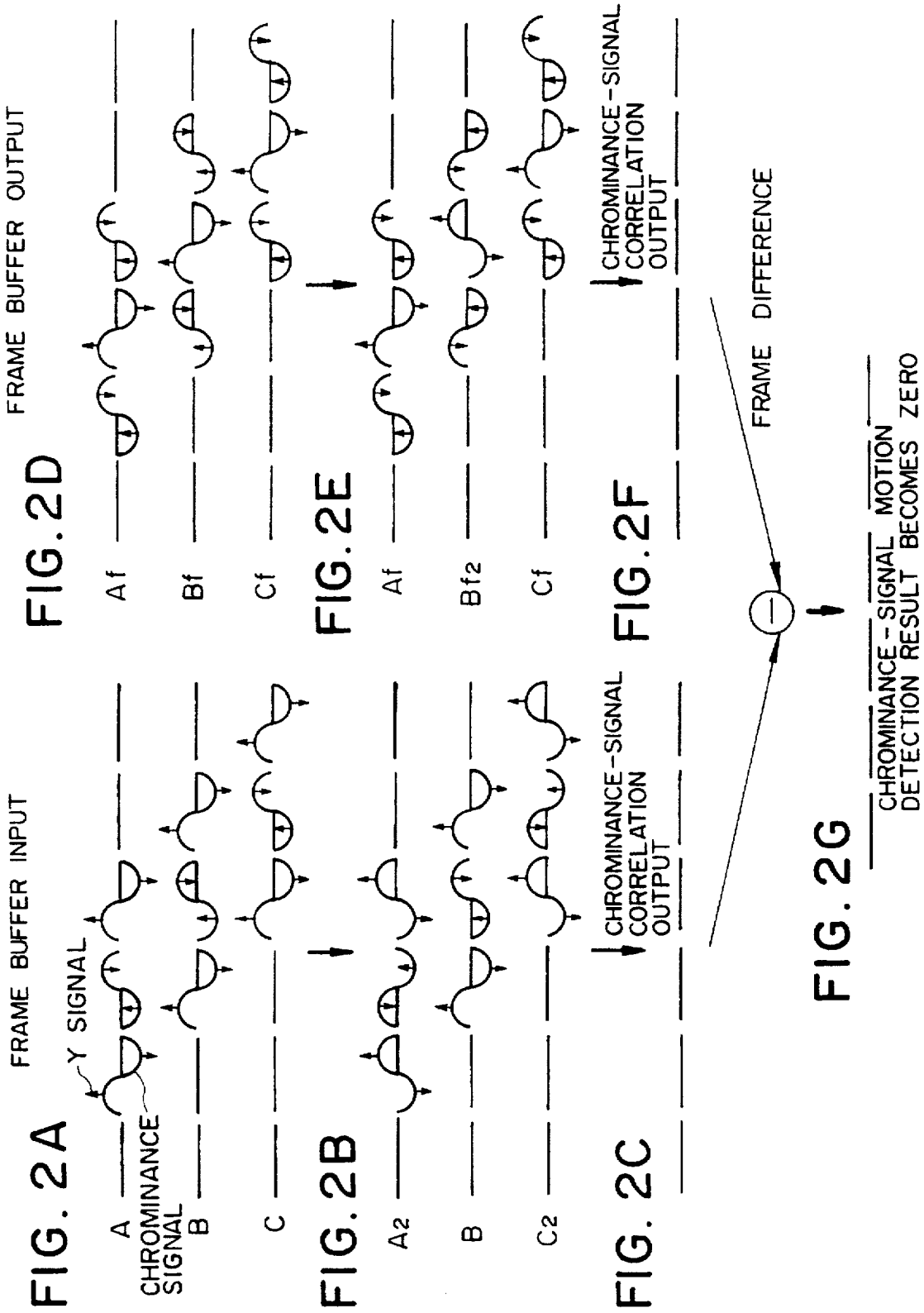
FIGS. 2A–2G are views showing the waveforms of input and output signals of the motion detection circuit, which are obtained when color, vertical lines having frequencies near the subcarrier frequency are input.

FIG. 2 shows signals observed when a still picture including color, thin, vertical lines corresponding to frequencies near the subcarrier frequency is input in this embodiment. FIG. 2A shows the signal before the frame buffer 57. Signal A is the signal output from the BPF 43, signal B indicates the signal output from the BPF 44, and signal C is the signal output from the BPF 45. The signals A, B, and C shift in phase by 1 H.

FIG. 2B shows the state in which output signal A from the BPF 43 is inverted in phase by the inversion circuit 46 to form signal $A_2$, and output signal C from the BPF 45 is inverted in phase by the inversion circuit 47 to form signal $C_2$. Since there is no correlation between signal $A_2$ and signal B, or between signal $C_2$ and B, the chrominance-signal correlation output becomes 0 as shown in FIG. 2C.

FIG. 2D shows the signal after the frame buffer 57. Signal Af is the signal output from the BPF 63, signal Bf indicates the signal output from the BPF 64, and signal Cf is the signal output from the BPF 65. The signals Af, Bf, and Cf shift in phase by 1 H.

FIG. 2E shows the state in which output signal $B_f$ from the BPF 64 is inverted in phase by the inversion circuit 66 to form signal $Bf_2$. Since there is no correlation between signal Af and signal $Bf_2$, or between signal Cf and $Bf_2$, the chrominance-signal correlation output becomes 0 as shown in FIG. 2F.

Therefore, the frame difference becomes 0, and the chrominance-signal motion detection output becomes 0. As a result, it is determined that a still picture is displayed on the screen. The frame comb filter is selected, and cross color and dot interference are removed.

Figure 3:
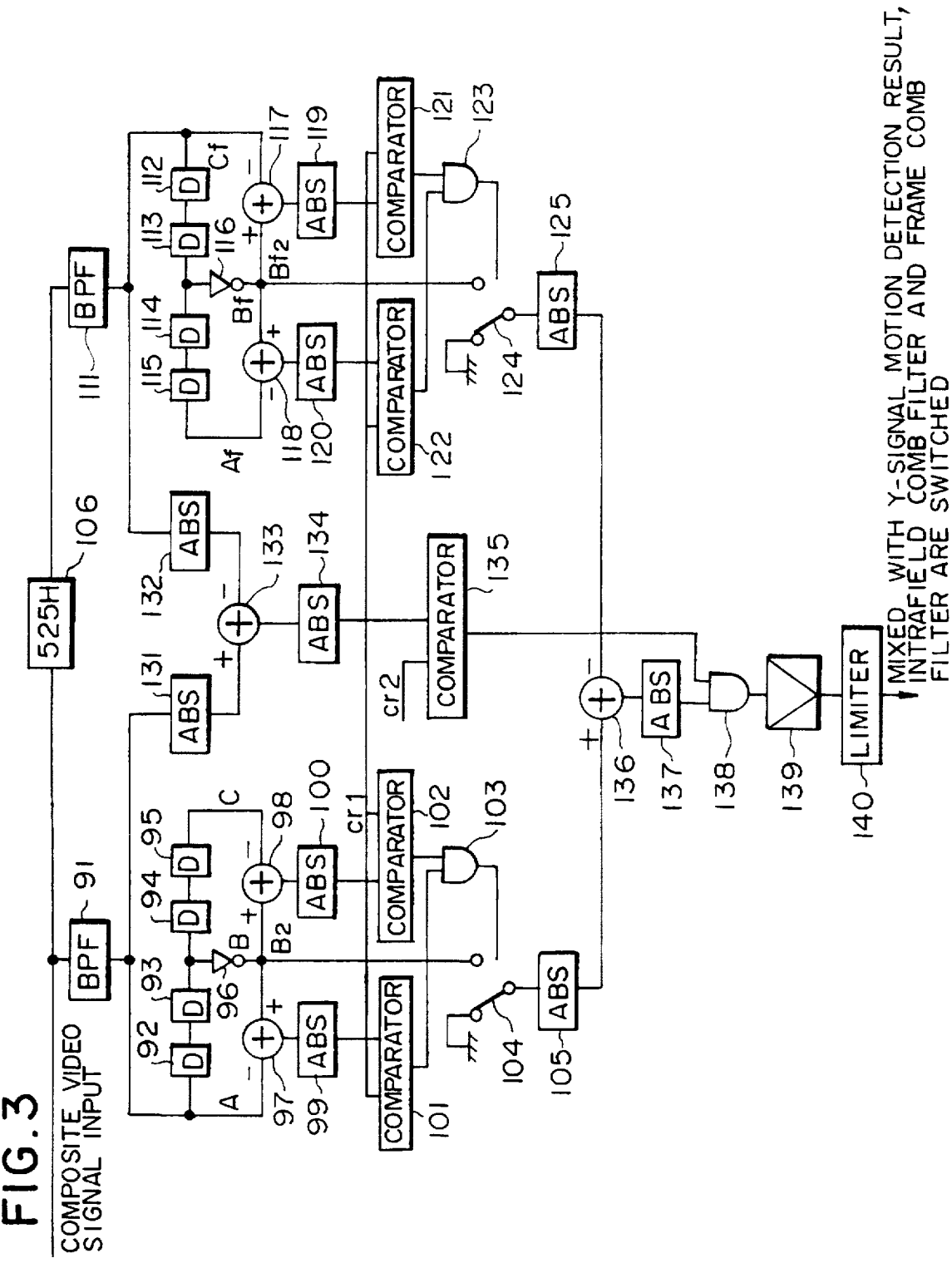
FIG. 3 is a block diagram showing a motion detection circuit according to another embodiment of the present invention.

FIG. 3 is a block diagram showing a configuration of a motion detection circuit according to another embodiment of the present invention. A BPF 91 separates the chrominance signal from the input composite video signal and outputs it. A frame buffer 106 stores the input composite video signal, and outputs it after a one-frame period. Therefore, the BPF 111 receives the composite video signal delayed for a one-frame period.

A delay circuit 92 delays the input signal for a one-clock period. This one clock period refers to that of the burst clock having the frequency four times the subcarrier frequency ($f_{sc}$), which is used for sampling the chrominance signal. Delay circuits 93, 94, and 95 delay the respective input signals for a one-clock period, and output them. An inversion circuit 96 receives the signal sent from the delay circuit 93 and inverts the phase of the signal. An adder 97 calculates the difference between the input signals from the BPF 91 and the inversion circuit 96, and outputs the result. In the same way, an adder 98 calculates the difference between the input signals from the inversion circuit 96 and the delay circuit 95, and outputs the result.

An ABS 99 calculates the absolute value of the signal output from the adder 97, and outputs the value. In the same way, an ABS 100 calculates the absolute value of the signal output from the adder 98, and outputs the value. A comparator 101 compares the signal output from the ABS 99 with the specified threshold cr1, and outputs the specified signal corresponding to the comparison result. In the same way, a comparator 102 compares the signal output from the ABS 100 with the specified threshold cr1, and outputs the specified signal corresponding to the comparison result.

When the level of the signal output from the ABS 99 is smaller than or equal to the specified threshold cr1, the comparator 101 outputs a signal having level 1, for example. When the level of the signal output from the ABS 99 is larger than the specified threshold cr1, the comparator 101 outputs a signal having level 0. In the same way, when the level of the signal output from the ABS 100 is smaller than or equal to the specified threshold cr1, the comparator 102 outputs a signal having level 1. When the level of the signal output from the ABS 100 is larger than the specified threshold cr1, the comparator 102 outputs a signal having level 0.

An AND circuit 103 calculates the logical AND of the signal output from the comparator 101 and the signal output from the comparator 102, and outputs the result. A switch 104 switches its internal connection according to the signal sent from the AND circuit 103. When a signal having level 1 is input from the AND circuit 103, for example, the switch 104 changes the internal connection such that the signal output from the inversion circuit 96 is supplied to the ABS 105. When a signal having level 0 is input from the AND circuit 103, the switch changes the internal connection such that a signal having level 0 is supplied to the ABS 105. The ABS 105 calculates the absolute value of the signal output from the switch 104, and outputs the result.

A BPF 111 separates the chrominance signal from the input composite video signal from the frame buffer 106, which is delayed for a one-frame period, and outputs the chrominance signal. A delay circuit 112 is made up of, for example, D flip flops, delays the input signal for a one-clock period, and outputs the signal. Delay circuits 113, 114, and 115 delay the respective input signals for a one-clock period, and output them. An inversion circuit 116 receives the signal sent from the delay circuit 113 and inverts the phase of the signal. An adder 117 calculates the difference between the input signals from the BPF 111 and the inversion circuit 116, and outputs the result. In the same way, an adder 118 calculates the difference between the input signals from the inversion circuit 116 and the delay circuit 115, and outputs the result.

An ABS 119 calculates the absolute value of the signal output from the adder 117, and outputs the value. In the same way, an ABS 120 calculates the absolute value of the signal output from the adder 118, and outputs the value. A comparator 121 compares the signal output from the ABS 119 with the specified threshold cr1, and outputs the specified signal corresponding to the comparison result. In the same way, a comparator 122 compares the signal output from the ABS 120 with the specified threshold cr1, and outputs the specified signal corresponding to the comparison result.

When the level of the signal output from the ABS 119 is smaller than or equal to the specified threshold cr1, the comparator 121 outputs a signal having level 1, for example. When the level of the signal output from the ABS 119 is larger than the specified threshold cr1, the comparator 121 outputs a signal having level 0. In the same way, when the level of the signal output from the ABS 120 is smaller than or equal to the specified threshold cr1, the comparator 122 outputs a signal having level 1. When the level of the signal output from the ABS 120 is larger than the specified threshold cr1, the comparator 122 outputs a signal having level 0.

An AND circuit 123 calculates the logical AND of the signal output from the comparator 121 and the signal output from the comparator 122, and outputs the result. A switch 124 switches its internal connection according to the signal sent from the AND circuit 123. When a signal having level 1 is input from the AND circuit 123, for example, the switch 124 changes the internal connection such that the signal $Bf_2$ output from the inversion circuit 116 is supplied to the ABS 125. The ABS 125 calculates the absolute value of the signal output from the switch 124, and outputs the result.

An ABS 131 calculates the absolute value of the signal output from the BPF 91, and outputs the result. An ABS 132 calculates the absolute value of the signal output from the BPF 111, and outputs the result. An adder 133 calculates the difference between the signal output from the ABS 131 and the signal output from the ABS 132, and outputs the result. An ABS 134 calculates the absolute value of the signal output from the adder 133, and outputs the result. A comparator 135 compares the signal output from the ABS 134 with the specified threshold cr2, and outputs the signal corresponding to the comparison result.

When the level of the signal input from the ABS 134 is smaller than or equal to the threshold cr2, a signal having level 0 is output, for example. When the level of the signal input from the ABS 134 is larger than the threshold cr2, a signal having level 1 is output.

An adder 136 calculates the difference between the signal output from the ABS 105 and the signal output from the ABS 125, and outputs the result. An ABS 137 calculates the absolute value of the input signal and outputs the result. An AND circuit 138 calculates the logical AND of the input signals, and outputs the result. A multiplier 139 adjusts the gain of the signal supplied from the AND circuit 138. A limiter 140 reduces the number of bits in the input signal to the specified number of bits.

A composite video signal input to such a motion detection circuit is supplied to the BPF 91 and the frame buffer 106. The composite video signal supplied to the BPF 91 is input to the delay circuit 92 after the chrominance signal is separated therefrom by the BPF 91. The delay circuit 92 delays the input signal for a one-clock period and outputs the signal. The signal output from the delay circuit 92 is input to the delay circuit 93, is delayed for a one-clock period, and is input to the inversion circuit 96 and the delay circuit 94.

The signal input to the delay circuit 94 is delayed for a two-clock period by the delay circuit 92 and the delay circuit 93. The inversion circuit 96 inverts the polarity of the input signal from the delay circuit 93 and outputs the inverted signal. The signal supplied to the delay circuit 94 is delayed for a one-clock period and is supplied to the delay circuit 95. The signal supplied to the delay circuit 95 is also delayed for a one-clock period and is output. Therefore, the signal output from the delay circuit 95 is delayed for a four-clock period from the original signal.

The signal output from the BPF 91 and the signal output from the inversion circuit 96, which is delayed for a two-clock period, are input to the adder 97, and the difference therebetween is calculated. The calculation result is converted to the absolute value thereof by the ABS 99 and is supplied to the comparator 101. Therefore, when the signal output from the inversion circuit 96 and the two-clock-lead signal (signal from the BPF 91) are the same, the signal output from the adder 97 becomes 0, and a signal having level 0 is supplied to the comparator 101. When the signal output from the inversion circuit 96 is different from the two-clock-lead signal, the adder 97 outputs the signal having the specified level, and the absolute value thereof is supplied to the comparator 101.

In the same way, the difference between the signal output from the delay circuit 95 and the signal output from the inversion circuit 96 is calculated by the adder 98, and the absolute value thereof is calculated by the ABS 100 and supplied to the comparator 102.

The comparator 101 compares the absolute value of the signal sent from the adder 97 with the specified threshold cr1. When the absolute value of the signal from the adder 97 is smaller than or equal to the threshold cr1, a signal having level 1 is output, for example. When the absolute value of the signal from the adder 97 is larger than the threshold cr1, a signal having level 0 is output.

In the same way, the comparator 102 compares the absolute value of the signal sent from the adder 98 with the specified threshold cr1. When the absolute value of the signal from the adder 98 is smaller than or equal to the threshold cr1, a signal having level 1 is output, for example. When the absolute value of the signal from the adder 98 is larger than the threshold cr1, a signal having level 0 is output.

The signal output from the comparator 101 and the signal output from the comparator 102 are input to the AND circuit 103, and the logical AND thereof is calculated. Therefore, when both of the signal from the comparator 101 and the signal from the comparator 102 have level 1, a signal having level 1 is supplied to the switch 104. In other words, when there exists horizontal correlation between the signals a two-clock period apart, the signals are regarded as chrominance signals. When either the signal from the comparator 101 or the signal from the comparator 102 has level 0, a signal having level 0 is supplied to the switch 104. In other words, when there does not exist horizontal correlation between the signals a two-clock period apart, the signals are not regarded as chrominance signals and a signal having level 0 is output.

When a signal having level 0 is supplied from the AND circuit 103, the switch 104 outputs a signal having level 0. When a signal having level 1 is supplied from the AND circuit 103, the switch 104 changes its internal connection such that the signal from the inversion circuit 96 is output. The absolute-value calculator 105 calculates the absolute value of the signal output from the switch 104, and supplies the value to the adder 136.

On the other hand, the composite video signal output from the frame buffer 106, which has been delayed for a one-frame period, is supplied to the BPF 111, and the chrominance signal is separated. The separated chrominance signal is supplied to the delay circuit 112 and the adder 117. The signal supplied to the delay circuit 112 is delayed for a one-clock period, and is supplied to the delay circuit 113. The signal supplied to the delay circuit 113 is delayed for a one-clock period, and is supplied to the inversion circuit 116 and the delay circuit 114. The signal supplied to the delay circuit 114 is delayed for a one-clock period, and is supplied to the delay circuit 115. The signal supplied to the delay circuit 115 is further delayed for a one-clock period, and is supplied to the adder 118. The signal supplied to the inversion circuit 116 is inverted in phase, and is output.

The adder 117 calculates the difference between the signal from the BPF 111 and the signal from the inversion circuit 116, and supplies the result to the ABS 119. The absolute value of the signal supplied to the ABS 119 is calculated and is supplied to the comparator 121. The adder 118 calculates the difference between the signal sent from the inversion circuit 116 and the signal sent from the delay circuit 115, and supplies the result to the ABS 120. The absolute value of the signal supplied to the ABS 120 is calculated, and is supplied to the comparator 122.

The comparator 121 compares the signal from the ABS 119 with the threshold cr1. When the level of the signal sent from the ABS 119 is smaller than or equal to the threshold cr1, a signal having level 1 is supplied to the AND circuit 123. When the level of the signal sent from the ABS 119 is larger than the threshold cr1, a signal having level 0 is supplied to the AND circuit 123.

The comparator 122 compares the signal from the ABS 120 with the threshold cr1. When the level of the signal sent from the ABS 120 is smaller than or equal to the threshold cr1, a signal having level 1 is supplied to the AND circuit 123. When the level of the signal sent from the ABS 120 is larger than the threshold cr1, a signal having level 0 is supplied to the AND circuit 123.

The AND circuit 123 calculates the logical AND of the signal output from the comparator 121 and the signal output from the comparator 122. Therefore, when both of the signal from the comparator 121 and the signal from the comparator 122 have level 1, a signal having level 1 is supplied to the switch 124. In other words, when there exists horizontal correlation between the signals a two-clock period apart, the signals are regarded as chrominance signals. When either the signal from the comparator 121 or the signal from the comparator 122 has level 0, a signal having level 0 is supplied to the switch 124. In other words, when there does not exist horizontal correlation between the signals a two-clock period apart, the signals are not regarded as chrominance signals and a signal having level 0 is output.

When a signal having level 0 is supplied to the switch 124, the switch 124 outputs a signal having level 0 to the ABS 125. When a signal having level 1 is supplied to the switch 124, the switch 124 changes its internal connection such that the signal from the inversion circuit 116 is output to the adder 136 through the ABS 125.

The adder 136 calculates the difference between the signal from the ABS 105 and the signal from the ABS 125. That is, the difference between frames is calculated. The ABS 137 calculates the absolute value of the difference calculated by the adder 136, and supplies the result to the AND circuit 138.

The chrominance signal output from the BPF 91 is converted to the absolute value thereof by the ABS 131, and the value is supplied to the adder 133. On the other hand, the chrominance signal output from the BPF 111 is converted to the absolute value thereof by the ABS 132, and the value is supplied to the adder 133. The adder 133 calculates the difference between the input signals, and supplies the difference to the ABS 134. The ABS 134 calculates the absolute value of the signal sent from the adder 133, and supplies the value to the comparator 135.

The comparator 135 compares the absolute value of the frame difference supplied from the ABS 134 with the specified threshold cr2. When the absolute value of the frame difference supplied from the ABS 134 is smaller than or equal to the specified threshold cr2, a signal having level 0 is output to the AND circuit 138. When the absolute value of the frame difference supplied from the ABS 134 is larger than the specified threshold cr2, a signal having level 1 is output to the AND circuit 138.

The AND circuit 138 calculates the logical AND of the signal sent from the comparator 135 and the absolute value of the frame difference output from the ABS 137, and supplies the result to the multiplier 139. The gain of the signal supplied to the multiplier 139 is adjusted, and the signal is supplied to the limiter 140. The limiter 140 reduces the number of bits in the input signal to the specified number of bits, and outputs the signal.

The BPFs 91 and 111 separate chrominance signals. Correlations between the polarity-inverted, intermediate output and the signals two clock periods therebefore and thereafter are detected. When both horizontal correlations (correlation between the intermediate signal and the signal two clock periods therebefore, and correlation between the intermediate signal and the signal two clocks thereafter) are smaller than or equal to the specified threshold (cr1), the signals are determined to be chrominance signals, and the intermediate signal is output. When the level of either one of the chrominance signals are larger than the threshold, it is determined that the signals are not chrominance signals, and the output is set to 0. At the delay side of the frame buffer, horizontal correlations are detected in the same way.

The absolute values of the respective chrominance correlation outputs before and after the frame buffer 106 are calculated, the frame difference is calculated, and the absolute value thereof is calculated to form a chrominance-signal motion component. The absolute values of the respective chrominance signal outputs before and after the frame buffer 106 are also calculated, and the frame difference is calculated. When the frame difference is smaller than or equal to the threshold cr2, the motion detection output is forcibly set to 0.

When horizontal correlation is detected between signals two clock periods apart, since there always exists random noise even in a still picture, the output may become 0 because the correlation in one frame exceeds the threshold. In this case, the frame difference becomes large, and the intrafield comb filter is selected, causing cross color. To prevent this side effect, when the frame difference is small, the comparator 135 forcibly sets the motion detection output to 0.

As described above, using the characteristics in which the chrominance signal of a component which is frequency-separated by a BPF has a phase inverted at an interval of two burst clocks and has the same amplitude, correlations between the specified signal and the signals two clock periods before and after the specified signal are detected. When it is determined that there exist correlations between the specified signals and the other two signals, the specified signal is regarded as a chrominance signal, and otherwise the signal is set to 0. A circuit for this function is added. The absolute values of the detected correlations are calculated, and the frame difference therebetween is calculated to form a motion detection component. When the frame difference in the component separated by the BPF is smaller than or equal to the specified threshold, the motion detection component is forcibly set to 0. A circuit for this function is also provided.

FIG. 4 shows the states of signals obtained when a still picture including color, diagonal lines having frequencies near the subcarrier frequency (3.58 MHz) is input in the above embodiment. In FIG. 4A, signal A indicates the signal output from the BPF 91, signal B is the signal output from the delay circuit 93, and signal C indicates the signal output from the delay circuit 95. Signal B is delayed for two clock periods against signal A, and signal C is delayed for two clock periods against signal B.

FIG. 4B shows signals input to the adder 97 and the adder 98. In FIG. 4B, signal $B_2$ indicates signal B of FIG. 4A whose polarity is inverted.

In FIG. 4D, signal Af is the signal output from the BPF 111, signal Bf is the signal output from the delay circuit 113, and signal C indicates the signal output from the delay circuit 115. Signal Bf is delayed for two clocks against signal Af. Signal Cf is delayed for two clock periods against signal Bf.

FIG. 4E shows signals input to the adder 117 and the adder 118. In FIG. 4E, signal $Bf_2$ indicates signal Bf of FIG. 4D whose polarity is inverted.

When a Y signal (in this embodiment, a Y signal has a frequency of 2.68 MHz for simplicity. Between diagonal lines, the phase is inverted) having a frequency shifted from the subcarrier frequency is mixed at both sides of the frame buffer, correlation against the signal two clock periods before and after is eliminated due to this Y-signal component, and the horizontal correlation outputs become 0 as shown in FIG. 4C and FIG. 4E at both sides of the frame buffer 106. Therefore, the frame difference and the chrominance-signal detection output become 0, and the frame comb filter is selected. Cross color is completely removed.

Figure 5:
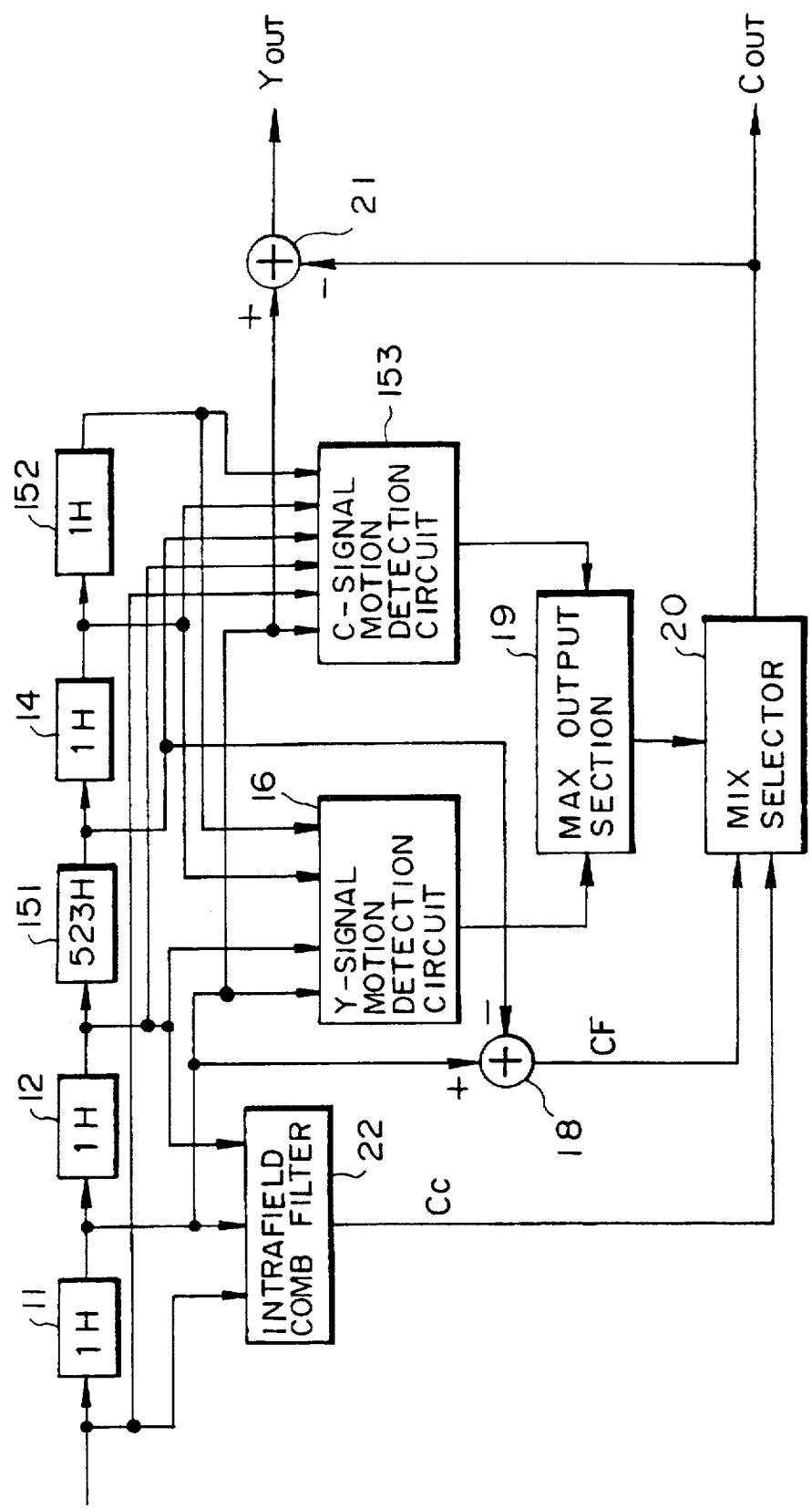
FIG. 5 is a block diagram showing a configuration of a Y/C separation circuit according to an embodiment, to which a luminance-/chrominance-signal separation apparatus according to the present invention is applied.

FIG. 5 is a block diagram showing a configuration of a Y/C separation circuit according to an embodiment, to which a luminance-/chrominance-signal separation apparatus according to this invention is applied. In this embodiment, the motion detection circuit shown in FIG. 1 is used. The chrominance-signal motion detection circuit 153 shown in FIG. 5 corresponds to the motion detection circuit shown in FIG. 1. Also in this embodiment, a frame buffer 152 storing a signal of 523 lines is substituted for the frame buffer 13 which stores a signal of 524 lines shown in FIG. 9, and a line memory 152 is substituted for the frame buffer 15 which stores a signal of 524 lines.

The C-signal motion detection circuit 153 receives the composite video signal obtained before being input into the line memory 11, the signal output from the line memory 11 (composite video signal), the signal output from the line memory 12, the signal output from the frame buffer 151, the signal output from the line memory 14, and the signal output from the line memory 152. The Y-signal motion detection circuit 16 (motion detection means) receives the signals output from the line memory 11, 12, 14, and 152.

Figure 9:
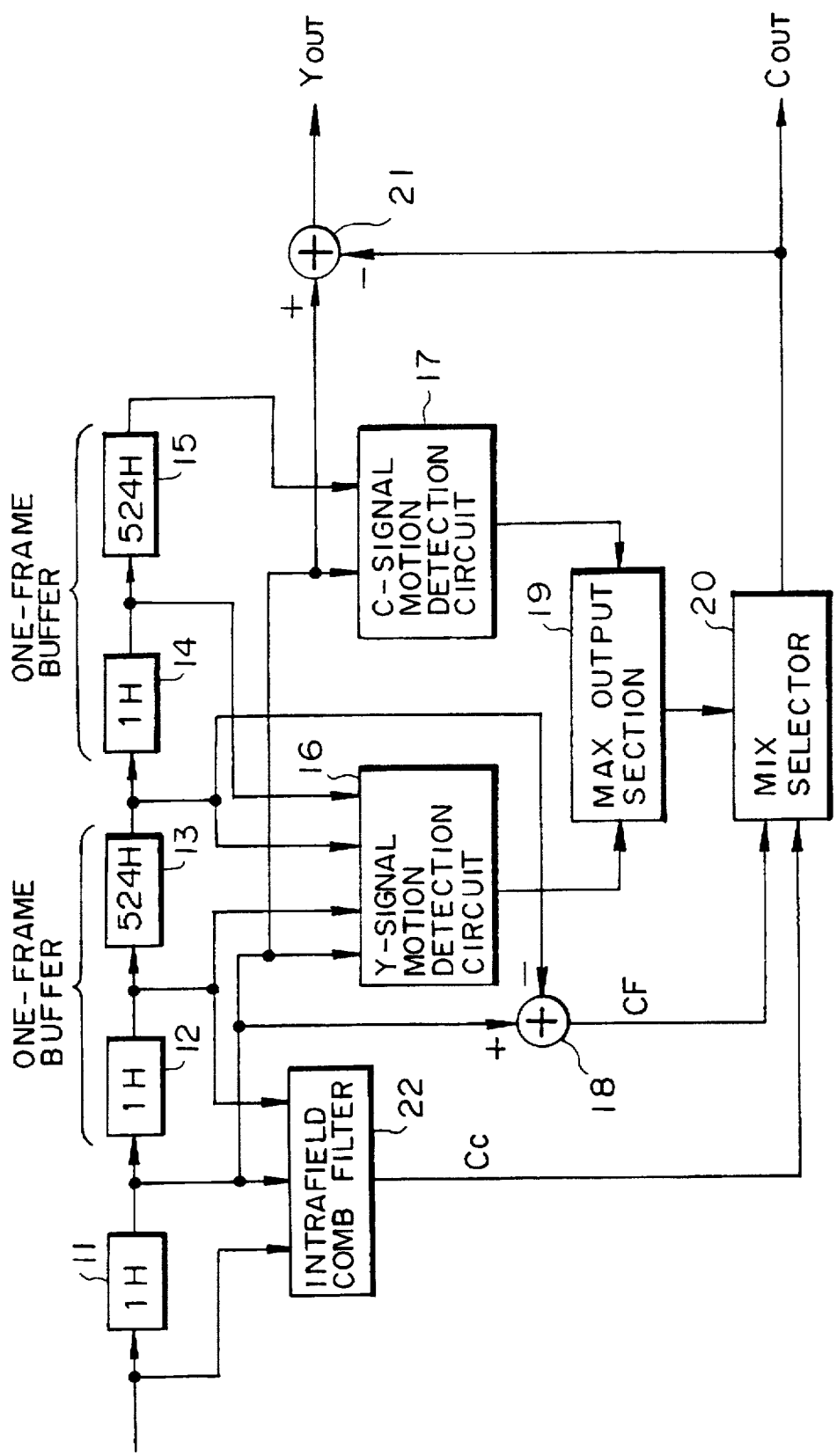
FIG. 9 is a block diagram showing a configuration of a conventional, three-dimensional Y/C separation circuit which uses a two-frame difference in chrominance-signal motion detection.
Figure 10:
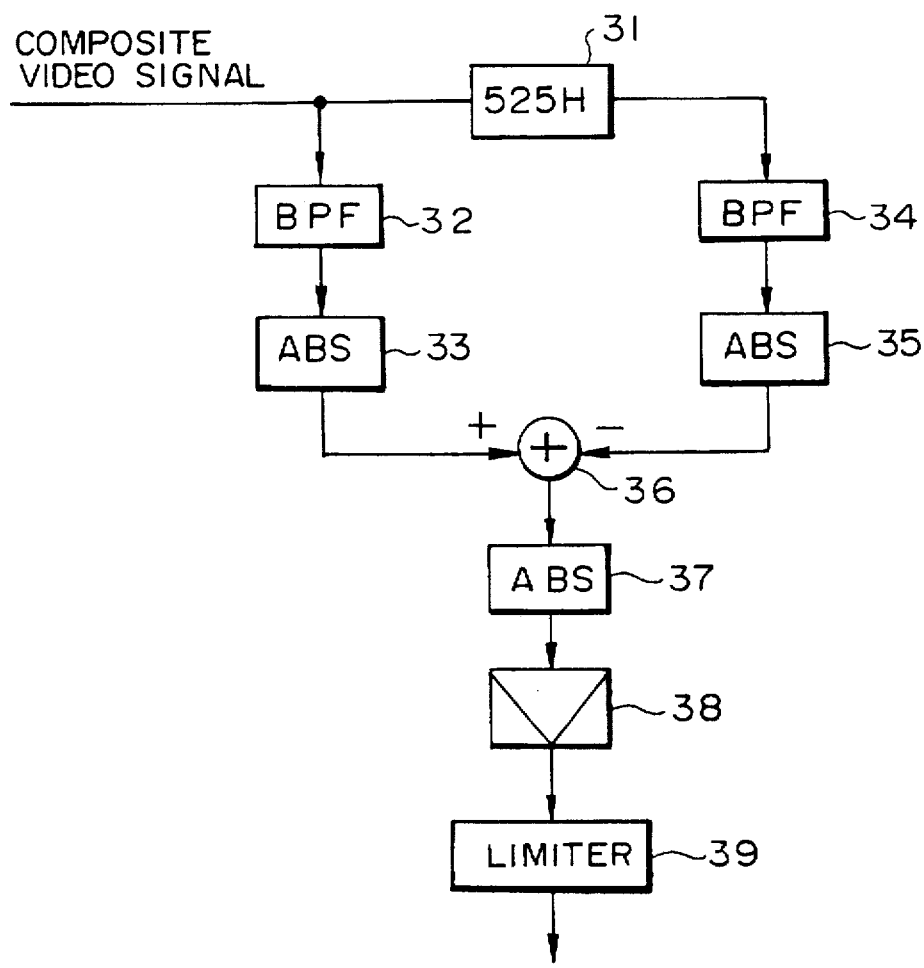
FIG. 10 is a block diagram showing a configuration of a chrominance-signal motion detection circuit which uses a conventional one-frame difference.

Since the other configurations and operations are the same as in the case shown in FIG. 9, detailed descriptions thereof will be omitted here. As described above, also in this embodiment, whichever is larger between the signal output from the C-signal motion detection circuit 153 and the signal output from the Y-signal motion detection circuit 16 is supplied to the mix selector 20, and either the signal output from the intrafield comb filter 22 (first separation means) or the signal output from the adder 18, which constitutes the frame comb filter, is selected to obtain the C signal. With the adder 21 (third separation means), the difference between this C signal and the signal output from the line memory 11 is calculated and is output as a Y signal.

Figure 6:
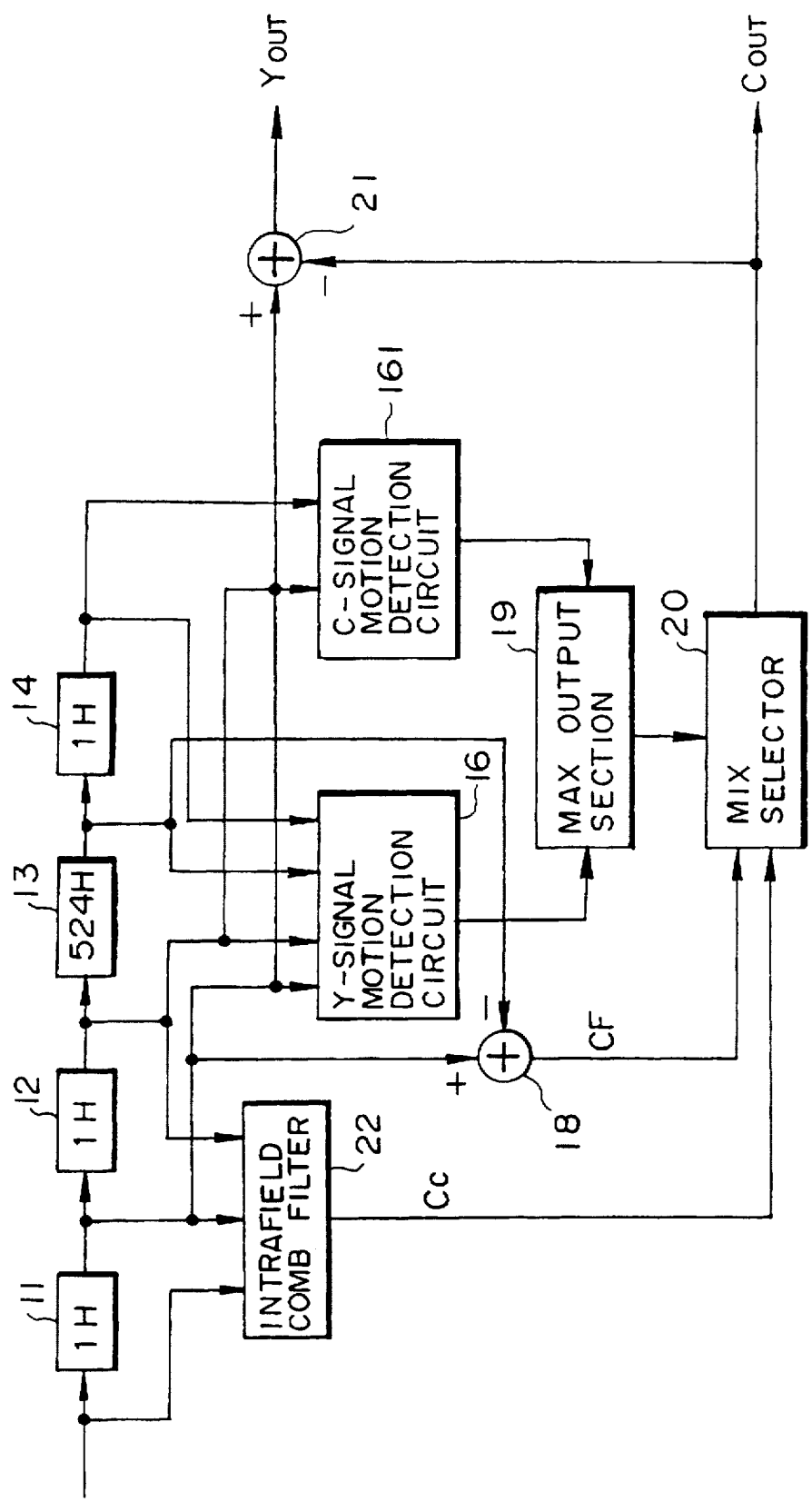
FIG. 6 is a block diagram showing a configuration of a Y/C separation circuit according to another embodiment, to which a luminance-/chrominance-signal separation apparatus according to the present invention is applied.
Figure 7:
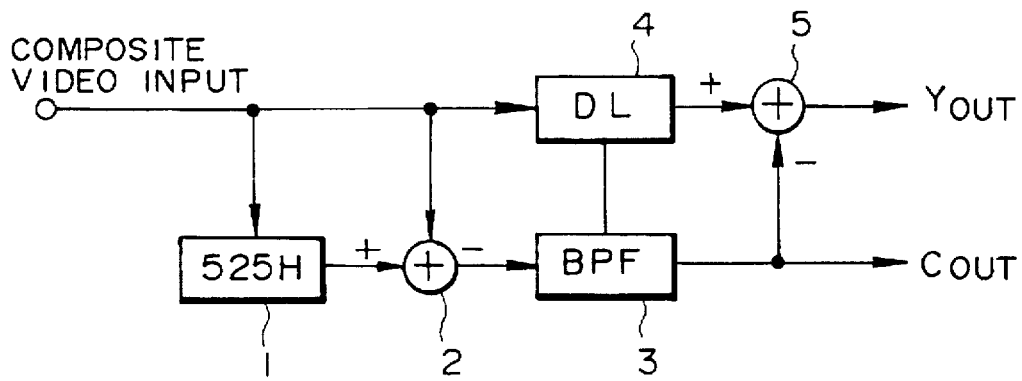
FIG. 7 is a block diagram showing a configuration of a conventional, three-dimensional Y/C separation circuit.
Figure 8:
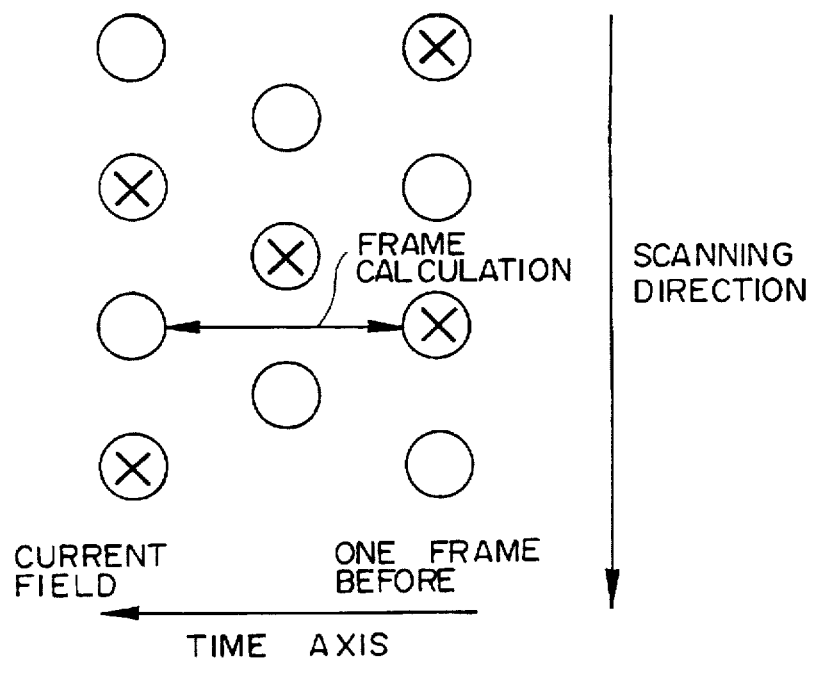
FIG. 8 is a view showing the relationship between scanning lines and the color subcarrier.

FIG. 6 is a block diagram showing a configuration of a Y/C separation circuit according to another embodiment, to which a luminance-/chrominance-signal separation apparatus according to this invention is applied. In this embodiment, the motion detection circuit shown in FIG. 3 is used. The chrominance-signal motion detection circuit 161 shown in FIG. 6 corresponds to the motion detection circuit shown in FIG. 1. In this embodiment, a frame buffer 15 storing a signal of 524 lines shown in FIG. 9 is removed. The C-signal motion detection circuit 161 receives the signal output from the line memory 12 and the signal output from the line memory 14.

Since the other configurations and operations are the same as in the case shown in FIG. 9, detailed descriptions thereof will be omitted here. As described above, also in this embodiment, whichever is larger between the signal output from the C-signal motion detection circuit 161 and the signal output from the Y-signal motion detection circuit 16 is supplied to the mix selector 20, and either the signal output from the intrafield comb filter 22 or the signal output from the adder 18, which constitutes the frame comb filter, is selected to obtain the C signal. With the adder 21, the difference between this C signal and the signal output from the line memory 11 is calculated and is output as a Y signal.

The motion detection circuit shown in FIG. 1 and the motion detection circuit shown in FIG. 3 can be combined. In that case, for example, both circuits are connected such that the signal output from the chrominance-signal correlation detection circuit 40 shown in FIG. 1 is input to a position after the BPF 91 shown in FIG. 3, and the signal output from the chrominance-signal correlation detection circuit 60 shown in FIG. 1 is input to a position after the BPF 111 shown in FIG. 3. With this configuration, motion detection is allowed according to inter-line correlation and horizontal correlation between a signal and signals two clock periods therebefore and thereafter.

What is claimed is:

1. A motion detection circuit comprising:
   delaying means for outputting an input video signal corresponding to a specified image with a delay of a one-frame period and forming a delayed signal;
   first detection means for detecting chrominance correlation from said input video signal and forming a first detection result;
   second detection means for detecting chrominance correlation from the delayed signal output from said delaying means and forming a second detection result;
   first calculation means for calculating a difference between the first detection result output from said first detection means and the second detection result output from said second detection means and forming a first calculation result;
   second calculation means for calculating a difference between said input signal and said delayed signal and forming a second calculation result;
   comparison means for comparing the second calculation result output from said second calculation means with a specified reference level and forming a comparison result; and
   output means for outputting a motion detection result according to the comparison result output from said comparison means and the first calculation result output from said first calculation means.

2. The motion detection means according to claim 1, wherein, according to a signal corresponding to a specified line in the image of said input video signal and signals corresponding to lines immediately before and after said specified line, said first detection means detects chrominance correlations between the specified line and the lines before and after the specified line, and, according to a signal corresponding to a specified line in the image of said delayed signal and signals corresponding to lines immediately before and after said specified line in said delayed signal, said second detection means detects chrominance correlations between the specified line and the lines before and after the specified line in the delayed signal.

3. The motion detection circuit according to claim 1, wherein said first detection means detects chrominance correlation between signals having phases shifted from each other by two burst clock signals whose frequency is four times a subcarrier frequency of the input video signal, and said second detection means detects chrominance correlation between said signals having phases shifted from each other by said two burst clock signals.

4. A motion detection method comprising the steps of:
   outputting an input signal corresponding to a specified image with a delay of a one-frame period and forming a delayed signal;
   detecting chrominance correlation from said input signal and forming a first detection result;
   detecting chrominance correlation from the delayed signal output with a delay of a one-frame period and forming a second detection result;
   calculating a difference between the first detection result of said input signal output and the second detection result of said delayed signal output;
   calculating a difference between said input signal and said delayed signal forming a calculation result;
   comparing the calculation result with a specified reference level and forming a comparison result; and
   outputting a motion detection result according to the comparison result and the difference between the first detection result of the chrominance correlation of said input signal and the second detection result of the chrominance correlation of said delayed signal.

5. The motion detection method according to claim 4, wherein, according to a signal corresponding to a specified line in the image of said input signal and signals corresponding to lines immediately before and after said specified line, chrominance correlations between the lines are detected, and according to a signal corresponding to the specified line in the image corresponding to said delayed signal and a signals corresponding to lines immediately before and after said specified line, chrominance correlations between the lines are detected in the delayed signal.

6. The motion detection method according to claim 4, wherein chrominance correlation between signals having phases shifted from each other by two burst clock signals whose frequency is four times a subcarrier frequency of the input signal is detected, and chrominance correlation between said delayed signals having phases shifted from each other by said two burst clock signals is detected in the delayed signals.

7. A luminance-/chrominance-signal separation apparatus comprising:
   delaying means for outputting an input signal corresponding to a specified image with a delay of a one-frame period and forming a delayed signal;
   first detection means for detecting chrominance correlation from said input signal and forming a first detection result;
   second detection means for detecting chrominance correlation from the delayed signal output from said delaying means and forming a second detection result;
   first calculation means for calculating a difference between the first detection result output from said first detection means and the second detection result output from said second detection means and forming a first calculation result;
   second calculation means for calculating a difference between said input signal and said delayed signal and forming a second calculation result;
   comparison means for comparing the second calculation result output from said second calculation means with a specified reference level and forming a comparison result;
   output means for outputting a motion detection result according to the comparison result output from said comparison means and the first calculation result output from said first calculation means;
   motion detection means for detecting motion according to a luminance signal;
   first separation means for separating a chrominance signal from the input signal using a signal in a field of the input signal;

second separation means for separating the chrominance signal using frame correlation;

selection means for selectively outputting either the chrominance signal output from said first separation means or the chrominance signal output from said second separation means according to an output from said motion detection means and the motion detection result output from said output means; and luminance separation means for separating the luminance signal according to an output from said selection means.

8. The luminance-/chrominance-signal separation apparatus according to claim 7, wherein according to a specified line in the image of said input signal and signals corresponding to lines immediately before and after said specified line, said first detection means detects chrominance correlations between the lines, and, according to a signal corresponding to a specified line in the image of said delayed signal and signals corresponding to the lines immediately before and after said specified line in said delayed signal, said second detection means detects chrominance correlations between the lines.

9. The luminance-/chrominance-signal separation apparatus according to claim 7, wherein said first detection means detects chrominance correlation between signals having phases shifted from each other by two burst clock signals whose frequency is four times a subcarrier frequency of the input signal, and said second detection means detects chrominance correlation between said delayed signals having phases shifted from each other by said two burst clock signals.

* * * * *